Patented May 30, 1939

2,160,572

UNITED STATES PATENT OFFICE 2,160,572

PROCESS FOR STABILIZING FATTY OIL POLYMERS

Egon Eichwald, Amsterdam, Netherlands, assignor to Shell Development Company, San Francisco, Calif., a corporation of Delaware No Drawing. Application April 27, 1937, Serial No. 139,337. In the Netherlands May 9, 1936

5 Claims. (Cl. 87—9)

This invention deals with the stabilization of fatty oil polymers suitable for the manufacture of lubricants, produced by catalytic polymerization of certain polymerizable fatty oils.

Fatty oil polymers produced in the catalytic polymerization of polymerizable unsaturated fatty oils of moderate or semi-drying qualities, and in particular polymers obtained in the polymerization of semi-drying fatty oils with boron fluoride as disclosed in my copending application, Serial No. 85,332, filed June 15, 1936, are used in combination with mineral lubricating oils for lubrication purposes. As I have shown in my copending application, these polymers are miscible with mineral lubricating oils in all proportions, if a certain characteristic of the polymers, the viscosity raising coefficient, is kept below certain limits. The viscosity raising coefficient is expressed by the formula $$\frac{\log V_E - \log V_A}{6} \times 29.54$$

in which $V_E$ is the viscosity at 50° C. in Saybolt seconds of a 6% by weight solution of the polymer in a mineral lubricating oil and $V_A$ is the viscosity at 50° C. in the same units of the mineral oil itself. Lubricating oils of relatively high aromaticity are miscible with polymers having viscosity raising coefficients up to about 2, while highly paraffinic oils, i. e., those which possess viscosity indexes of about 100 or higher, are only capable of dissolving polymers of viscosity raising coefficients not in excess of about .9 or 1.

Viscosity raising coefficients of polymers obviously will vary depending upon how far the polymerization has progressed. This in turn is controlled by the degree of unsaturation of the fatty oils, the type of catalysts used, and the time and temperature of the polymerization treatments. As has been shown, from the point of view of lubrication, the most desirable polymers have viscosity raising coefficients above about .5. Likewise, it is not desirable that the polymers contain unpolymerized fatty oils.

The manufacture of the most suitable polymers is commonly carried out by digesting a moderately drying or semi-drying fatty oil with the proper amount of catalyst such as boron fluoride at moderately elevated temperatures for a period which may last several days. When the polymerization has reached the desired point, the mixture may be dissolved in a suitable solvent, such as benzol, and the resulting solution is washed with an aqueous polar organic solvent such as a lower alcohol or ketone, for instance methyl, ethyl, or propyl alcohol, acetone, methyl-ethyl ketone, etc., containing small amounts of water, whereby the boron fluoride catalyst is hydrolyzed, and the reaction is terminated. The solvent is then removed by distillation, and the polymer, which is an extremely viscous mass, may be dissolved in a mineral lubricating oil in the proportion necessary to produce a finished lubricating oil of improved oiliness, which proportion usually varies between about 2-6% by weight of the oil. Usually, however, the polymer goes first to storage, to be blended with mineral lubricating oils at some later convenient time.

It has been found that the polymers in storage undergo certain highly undesirable changes. A slow after-polymerization takes place, which causes a more or less rapid decline in the solubility of at least a portion of the polymers in mineral lubricating oils, particularly in those of high viscosity indexes. This after-polymerization may progress to a point at which the polymers or part thereof have become substantially insoluble in mineral lubricating oils.

While it is realized that the polymers obtained in the manner described are somewhat unsaturated and contain double bonds, still the nature of this after-polymerization is not quite understood. It does not seem to be due to oxygen, with which the polymer comes in contact, as the addition of anti-oxidants has no retarding effect, and polymerization catalysts other than air are not normally present. Polymers produced by catalytic polymerization of unsaturated fatty oils seem to differ in this respect from polymers produced by electrical polymerization of fatty oils by means of silent electric discharges. The latter products appear to be essentially saturated and do not undergo after-polymerization upon storage.

It is the purpose of this invention to provide a simple means for stabilizing polymers from fatty oils of the type herein described without otherwise lowering their value for blending purposes for the production of high-grade mineral lubricating oils of improved oiliness.

I have discovered that the after-polymerization hereinbefore described can be stopped effectively by incorporating into the polymers a small amount of a mineral lubricating oil or grease. Frequently about 5% of mineral lubricating oil by volume is sufficient, although, in general, and in order to be on the safe side, I prefer to add larger quantities, for instance 30 to 300%.

While there is no reason from the point of stability to add even larger quantities, it is generally advantageous to limit the quantity of mineral oil which will effectively stabilize the polymer. In the first place, quantities of stabilizing oil larger than about 300 volume per cent have practically no influence in the matter of further stabilizing the polymers, the improvement in stability being very rapid upon the addition of the first few per cent of mineral oil, and the magnitude of the improvement declining upon further addition to reach approximately zero, after having added about 300%. Furthermore, it may not be desirable to have excessively large amounts of the stabilizing oil in the lubricating oil with which the polymer is eventually blended to produce a finished lubricating oil of a certain grade. Also the admixture of relatively large amounts of mineral oil calls for extra storage capacity for the polymers, which contributes to the cost of the product; and if the polymer is to be shipped over long distances to be blended with a mineral oil at some other location, the cost of transportation is raised in proportion to the amount of mineral oil contained in the polymer.

On the other hand relatively large quantities of stabilizing oil of the order of 30 to 300% sufficiently reduce the viscosity of the polymer so that it can be handled by ordinary equipment available in refineries, i. e., it can be pumped by pumps designed to handle lubricating oils and the like, whereas prior to dilution the extreme viscosity of the polymer makes handling a very difficult problem.

Thus depending upon conditions of handling, storage, shipment, etc., I usually dilute the polymer in the above indicated proportions and preferably with about 50 to 150% of a mineral oil, immediately after having completed the manufacture of the polymer. This dilution may be carried out before or after the removal of the catalyst from the polymer. Generally it is easier to do the blending while the polymer is hot or is in solution of a low viscosity solvent as benzol, and the steps of washing and distilling of the solvent may be carried out in the presence of the stabilizing oil, if desired. Under some circumstances the polymerization itself may be carried out in the presence of a relatively small amount of mineral lubricating oil.

The nature of the stabilizing oil is of importance, in so far as its miscibility with the polymers is concerned. Obviously the polymer and the mineral stabilizing oil must be miscible with each other in substantially all proportions. Therefore if the viscosity raising coefficient of the polymer is between about 1 and 2, a lubricating oil of relatively high aromaticity, i. e., having a viscosity index substantially below 100, must be used for stabilization, whereas if this constant is below 1, all lubricating oils are suitable including oils having high viscosity indexes of the order of 100 and above.

The following examples illustrate the effect of adding stabilizing oils to fatty oil polymers.

*Example I*

Soya bean oil was digested at 70° C. for 50 hours with 2% by weight of boron fluoride. The resulting polymer was washed several times with 96% ethyl alcohol at 25° C. while centrifuging, to remove the catalyst. The alcohol retained by the polymers was removed from the latter by distillation.

The polymer, free from catalyst, was then divided into two portions, one of which was blended with an equal volume of lubricating oil. Both portions, the blended and the unblended, were subjected to storage tests. After a few days the unblended portion showed considerable flocculation, and after about two months a gelatinous mass had separated, particularly on the surface of the sample, while the blended portion showed no change at all during the entire period.

The unblended portion had become practically insoluble in mineral lubricating oils, particularly in those of high paraffinicity such as Pennsylvania oils, solvent extracted oils, synthetic lubricating oils of the type produced by polymerization of olefines obtained in the vapor phase cracking of paraffin wax.

*Example II*

A mixture of 80% by weight of rapeseed oil and 20% of sunflower oil was digested for 60 hours at 80° C. with 2% by weight of boron fluoride. The polymer so obtained was washed several times with 96% ethyl alcohol at 50° C., and the washed polymer was stripped of dissolved alcohol by distillation.

The polymer was then divided into two portions, and one portion while still hot was mixed with one-half of its own volume of a lubricating oil. Both portions were stored for several months. The blended portion showed no visible changes, while the unblended portion had become highly gelatinized and almost completely insoluble in mineral oils of high viscosity indexes.

*Example III*

A mixture of 85% of rapeseed oil and 15% of cotton seed oil was digested at 80° C. for 80 hours with 1% by weight of boron fluoride. The polymer so obtained was washed 4 times with 96% ethyl alcohol at 50° C., and the washed polymer was stripped of dissolved alcohol by distillation. The finished product was divided into two portions, one of which was immediately diluted with twice its own volume of a lubricating oil. After a few days the undiluted portion began showing signs of flocculation and gelatinization, which rapidly progressed upon continued storage, while the diluted portion remained unchanged over the entire storage period of several months.

I claim as my invention:

1. In the process of producing a storage stable concentrate of a polymerized fatty oil obtained by catalytic polymerization of an unsaturated polymerizable fatty oil, the steps of digesting said polymerizable fatty oil with a polymerization catalyst under conditions to produce a polymer which is miscible with mineral lubricating oils in substantially all proportions, diluting the resulting polymer with 5 to 300 volume per cent of a mineral lubricating oil and separating the catalyst from the resulting solution.

2. A storage stable polymer concentrate consisting essentially of a solution of fatty oil polymer which is miscible with mineral lubricating oil in substantially all proportions and which in the absence of polymerization catalysts undergoes an after-polymerization during storage, in 5 to 300 volume per cent of a mineral lubricating oil.

3. A storage stable polymer concentrate consisting essentially of a solution of an unsaturated polymer of a polymerizable fatty oil, said polymer being miscible with mineral lubricating oils in substantially all proportions, in 5 to 300 volume per cent of a mineral lubricating oil.

4. A storage stable polymer concentrate consisting essentially of a solution of a catalytically produced polymer of an unsaturated fatty oil having a viscosity raising coefficient not in excess of 2, in 5 to 300 volume per cent of a mineral lubricating oil miscible with said polymer in substantially all proportions.

5. A storage stable polymer concentrate consisting essentially of a solution of a catalytically produced polymer of a semi-drying fatty oil having a viscosity raising coefficient between about .5 to 2.0, in 5 to 300 volume per cent of a mineral lubricating oil miscible therewith in substantially all proportions.

EGON EICHWALD.